Figure 1:
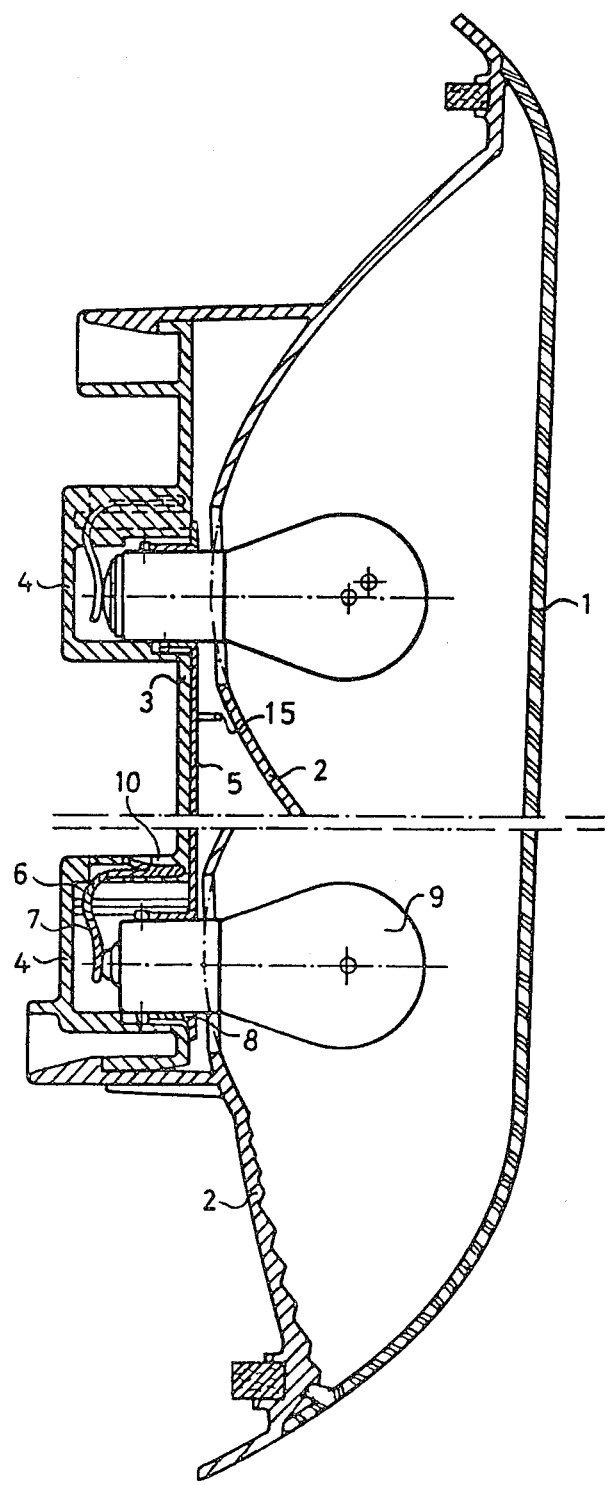

United States Patent [19]

Bärtl

[11] 4,423,475
[45] Dec. 27, 1983

[54] MULTI-CHAMBER LAMP FOR VEHICLES

[75] Inventor: Richard Bärtl, Lippstadt, Fed. Rep. of Germany

[73] Assignee: Westfälische Metall Industrie KG Hueck & Co., Lippstadt, Fed. Rep. of Germany

[21] Appl. No.: 348,394

[22] Filed: Feb. 12, 1982

[30] Foreign Application Priority Data

Mar. 19, 1981 [EP] European Pat. Off. ........ 81102053.6

[51] Int. Cl.³ ............................................ F21V 21/00
[52] U.S. Cl. .................................... 362/249; 362/80; 362/83; 362/368; 362/382
[58] Field of Search .................... 362/80, 83, 249, 368, 362/382

[56] References Cited

U.S. PATENT DOCUMENTS 4,364,101 12/1982 Brockmeyer ........................ 362/249

Primary Examiner—Stephen J. Lechert, Jr.
Attorney, Agent, or Firm—Max Fogiel

[57] ABSTRACT

Multi-compartment lamp for vehicles that has a one-piece sheet-metal lamp holder (5) incorporating, first, sockets (4, 11) consisting of openings (11) for bulbs and of bodies (4) surrounding a base and molded in one piece with the holder or reflector body or with a rear-beam mask (3) and, second, at least one nominal expansion site consisting of a punched-out U-shaped path between the sockets (4, 11), which are widely separated, characterized in that the two parallel legs (15a, 15b) of the U-shaped path are oriented along the direction of the desired lamp-holder expansion and in that the area (15) between the legs (15a, 15b) is bent out of the plane of the lamp holder (5) at an angle of 90°.

2 Claims, 3 Drawing Figures

MULTI-CHAMBER LAMP FOR VEHICLES

The invention is a multi-compartment lamp for vehicles that has a one-piece sheet-metal lamp holder incorporating, first, sockets consisting of openings for bulbs and of bodies surrounding a base and molded in one piece with the holder or reflector body or with a rear-beam mask and, second, at least one nominal expansion site consisting of a punched-out U-shaped path between the sockets, which are widely separated.

The hairpin-shaped nominal expansion site in the embodiment specified in German Pat. No. 2 602 237 is punched out of the lamp holder. The resulting path is very narrow to minimize the bending moment that occurs when the holder is being fitted to the lamp component that supports the socket bodies. This embodiment has proven to be optimal to manufacture. Since, however, the lamp holder, which is common for all the bulbs is also the common ground connection, the cross-section of the nominal expansion site cannot be as small as would be desirable because its electrical resistance would be too high.

The invention is intended as a lamp with a nominal expansion site that has a larger cross-section while the bending moment that must be expended in adjusting the distance between the openings for bulbs in the lamp holder is low.

This objective is attained in accordance with the invention because the two parallel legs of the U-shaped path are oriented along the direction of the desired lamp-holder expansion and in that the area between the legs is bent out of the lamp-holder plane to at least 90°. Since, then, the path that forms the nominal expansion site is thus bent around an edge that is determined by the strength of the sheet metal, widening the path will increase the bending moment only insignificantly.

Figure 2:
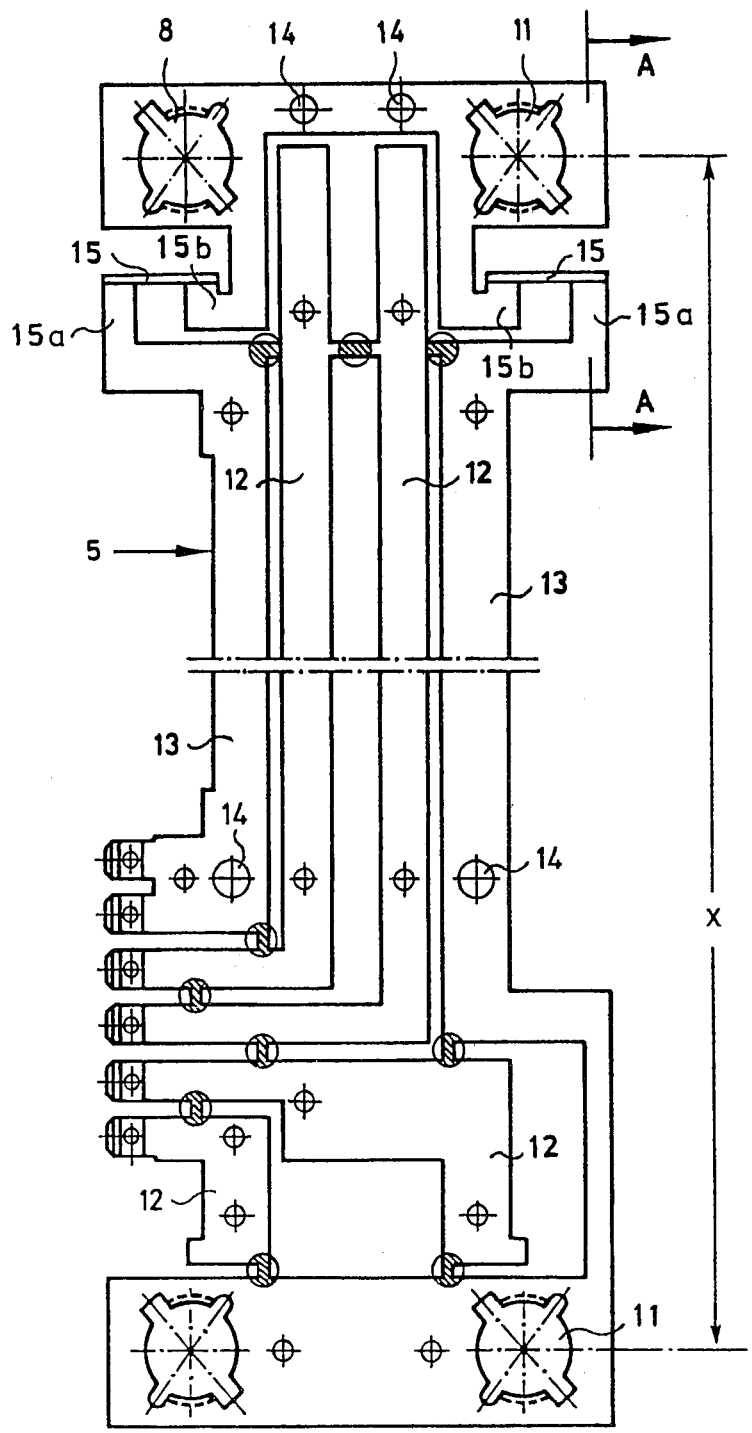
Figure 3:
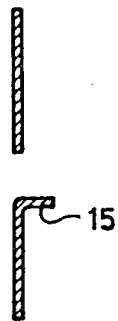

The drawing illustrates one embodiment of the invention,

FIG. 1 showing both ends of a multicompartment lamp that is represented in section, FIG. 2 a lamp holder with two nominal expansion sites, and FIG. 3 a section along the line A—A through the lamp holder.

The lamp in FIG. 1 consists essentially of a one-piece or multiple light disk 1, of a reflector body 2 that separates the lamp into several compartments, of a one-piece lamp holder 5, and of a one-piece rear-beam mask 3 to which lamp-socket bodies 4 are molded. Tabs 8 extend at a right angle from lamp holder 5 and into socket bodies 4, in conjunction with which they form sockets. A base pin on the free end of each spring contact 6 forces each bulb 9 against projecting tabs 8, establishing an electric connection between socket and holder 5. Current is supplied to the tip contact of each bulb through spring contacts 6, the free ends of which are tensioned against the tip contacts while their other hands are connected to the power supply.

Electricity can be supplied over individual cables or over tracks punched out of the lamp holder. Such tracks are mounted on rear-beam mask 3, to which they are mechanically connected. Rear-beam mask 3 is made of an insulating material like plastic to insulate the individual tracks from each other. There is a real advantage to combining the theory of the invention with tracks punched out of the lamp holder because, in addition to the advantages mentioned in the introduction, it will save wiring between a multiple plug and the individual sockets. A lamp holder of this type with punched-out tracks that conduct the current is illustrated in FIG. 2. It has openings 11 for bulbs 9 at each fixed end. Tabs 8 project at a right angle from the border of these openings. Tracks 12 supply current to the tip contacts of the bulbs while tracks 13 are the common ground contact for all the bulbs. Since the mass X between openings 11 is very large, so that the mass of rear-beam mask 3 along with that of the molded-on socket bodies is difficult to maintain precisely, a means of equilibrating the mass X of lamp holder 5 and the mass X of the socket bodies must be provided. This means is provided in the embodiment illustrated in FIG. 2 by punching a U-shaped path 15, 15a, and 15b out of lamp holder 5 and bending the area 15 between its legs, which extend along the desired direction of expansion, up at a right angle. Extending or shortening mass X will bend area 15 between legs 15a and 15 b. The right-angled cross-section of the leg being bent is positioned so that leg 16 will be bent over the small edge, the length of which is determined by the strength of the sheet metal. This will minimize the bending moment even when the U-shaped path is very wide.

In connecting lamp holder 5 to rear-beam mask 3, pins molded into the mask engage holes 14 in the holder and compensate for differences between the distance of socket bodies 4 and the distance of openings 11 in the lamp holder.

I claim:

1. Multi-compartment lamp for vehicles comprising; a one-piece sheet-metal lamp holder; sockets having openings for bulbs and having bodies surrounding a base and molded in one-piece with the holder or reflector body or with a rear-beam mask; at least one nominal expansion site comprising a punched-out U-shaped path between the sockets, said sockets being widely separated; said U-shaped path having two parallel legs oriented along the direction of the desired lamp-holder expansion; said legs having a connecting area therebetween which is bent out of the plane of the lamp holder at an angle of substantially 90°, said expansion site being formed by a path being bent around an edge dependent on the strength of the sheet metal so that widening of the path increasing negligibly bending moment arising in adjustment of distance between openings for bulbs in the lamp holder, said expansion site having a substantially large cross-section relative to substantially low bending moment.

2. A multi-compartment lamp as defined in claim 1, including tab elements projecting at right angle from the border of said openings for bulbs; tracks for supplying current to tip contacts of said bulbs; tracks comprising a common ground contact for all bulbs; and pins molded into a rear-beam mask engaging openings in the holder to compensate for differences between distance of sockets and distance of openings in the lamp holder.

* * * * *